United States Patent
Lee

(10) Patent No.: US 6,414,815 B1
(45) Date of Patent: Jul. 2, 2002

(54) APPARATUS AND METHOD FOR CONTROLLING ON-TRACK OPERATION OF AN ACTUATOR IN A HARD DISK DRIVE

(75) Inventor: Bong-jin Lee, Gumi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/253,762

(22) Filed: Feb. 22, 1999

(30) Foreign Application Priority Data

Feb. 20, 1998 (KR) .............................................. 98-5407

(51) Int. Cl.[7] .............................................. G11B 5/596
(52) U.S. Cl. .................................................... 360/78.12
(58) Field of Search ................................ 360/75, 78.12, 360/256; 318/456

(56) References Cited

U.S. PATENT DOCUMENTS

| | | | |
|---|---|---|---|
| 3,994,016 A | 11/1976 | Moghadam | |
| 4,419,701 A | 12/1983 | Harrison et al. | |
| 4,524,397 A | 6/1985 | Chalmers et al. | |
| 4,786,994 A | * 11/1988 | Carteau et al. | ................ 360/75 |
| 4,797,756 A | 1/1989 | Yoshihara et al. | |
| 4,812,726 A | 3/1989 | Benii et al. | |
| 4,907,109 A | * 3/1990 | Seino | .................. 360/78.12 X |
| 4,954,907 A | 9/1990 | Takita | |
| 5,184,257 A | 2/1993 | Koga et al. | |
| 5,189,653 A | 2/1993 | Yanagi | |
| 5,235,478 A | 8/1993 | Hoshimi et al. | |
| 5,251,194 A | 10/1993 | Yoshimoto et al. | |
| 5,479,388 A | 12/1995 | Gondou et al. | |
| 5,600,219 A | * 2/1997 | Gomez | ................ 360/78.12 X |
| 5,663,846 A | * 9/1997 | Masuoka et al. | .............. 360/75 |
| 5,754,357 A | * 5/1998 | Anderson et al. | .............. 360/75 |
| 5,831,786 A | * 11/1998 | Boutaghou et al. | ............ 360/75 |

* cited by examiner

Primary Examiner—David Hudspeth
Assistant Examiner—K. Wong
(74) Attorney, Agent, or Firm—Robert E. Bushnell, Esq

(57) ABSTRACT

Apparatus and method of controlling the on-track position of an actuator in a hard disk drive to be held on a predetermined position of a track. The apparatus includes a voice coil motor (VCM) driving unit, a position detecting unit, and a controller. The voice coil motor (VCM) driving unit applies a predetermined current to drive a voice coil motor (VCM). The position detecting unit reads data read by a head to detect a position of the actuator. The controller disables the voice coil motor (VCM) driving unit after unlatching the actuator, and enables the voice coil motor (VCM) driving unit if the position detecting unit detects that the actuator is positioned on a predetermined track and bringing the actuator on-track depending on the output of the position detecting unit. The method includes the steps of unlatching the actuator, disabling a voice coil motor (VCM) driving unit, determining whether the actuator stops on a predetermined track, and enabling the voice coil motor (VCM) driving unit if the actuator stops on a predetermined track, to bring the actuator on-track. Thus, the voice coil motor (VCM) driving unit is disabled after unlatch, minimizing external disturbance due to offset of circuits or devices, such as the voice coil motor (VCM) driving unit, an operational amplifier (OP-AMP) and one or more passive elements of the apparatus.

28 Claims, 3 Drawing Sheets

APPARATUS AND METHOD FOR CONTROLLING ON-TRACK OPERATION OF AN ACTUATOR IN A HARD DISK DRIVE

CROSS REFERENCE TO RELATED APPLICATION

This application makes reference to, incorporates the same herein, and claims all benefits accruing under 35 U.S.C. §119 from an application for APPARATUS AND METHOD FOR CONTROLLING ON-TRACK OPERATION OF ACTUATOR IN HARK DISK DRIVE earlier filed in the Korean Industrial Property Office on Feb. 20, 1998 and there duly assigned Ser. No. 98/5407.

BACKGROUND OF THE INVENTION

1. Field of the Invention

The present invention relates to a hard disk drive, and more particularly, to an apparatus for controlling on-track operation in which an actuator is brought on a predetermined position of a track, and to a method thereof.

2. Description of the Related Art

A hard disk drive is an auxiliary computer memory which stores and retrieves information on a disk using a magnetic head. Two types of motors are used to drive the hard disk drive: a spindle motor for rotating a magnetic disk and a voice coil motor for locating the magnetic head on a target track. The voice coil motor is a linear motor, and is driven by a magnetic force by applying current to a coil in a magnetic field formed by a magnet.

Meanwhile, if the power supply of the disk drive is turned off, the spindle motor stops rotating and the head loses its buoyance, so that the head is parked automatically in a parking zone of the disk. At this time, if external vibration or impact is applied to the hard disk drive, the head contacts a data zone of the disk and can cause hard defects, thereby damaging the disk and losing data. The disk having the hard defects cannot be read or written. Thus, a latch is required to hold an arm on which the head is mounted, with a constant force, to avoid the above problems.

Unlatching is opposite to latching, i.e., a routine in which power is applied to the hard disk drive, various integrated circuits (ICs) are initialized in software, and further the actuator moves from the parking zone to a data zone. The unlatch operation is performed by applying an unlatch current to the voice coil motor, and involves initially seeking or on-track, bringing the actuator on a predetermined track. If the unlatch current applied to the voice coil motor in order to move the actuator is excessively high, then the disk, when the actuator is unlatched, in an inner or outer disk can be impacted, which can thereby damage the head and the disk.

Also, even if the actuator is positioned in the data zone, since disturbance of various devices or circuits is not known, it is difficult to bring the actuator on-track in an initial state. That is, after applying the unlatch current, the actuator has a high speed due to disturbances such as air resistance, bearing friction or offset of the circuit during the initial seek or on-track, so that it is very difficult to perform the initial on-track. The disturbances caused by the apparatus are regular, and typically can be corrected by calculating a mean of the offset. However, since various integrated circuit (IC) and passive elements are random, it is almost impossible to estimate the offset of the circuit.

Accordingly, in order to reduce the influence due to the external disturbances during the initial on-track or seek, there have been developed a bearing having low friction, and a suspension for reducing the air resistance. Further, in order to reduce the offset of the circuit, devices having high accuracy are used. However, all these increase the cost. Also, when the disturbance cannot be reduced, it is difficult to develop a device having high Tracks Per Inch.

U.S. Pat. No. 3,994,016 to Moghadam entitled *Head Positioning Servo System for Disk Drives*, discloses a closed loop head positioning servo system for use in a disk drive employing a disk pack having a dedicated servo surface and a number of data surfaces carrying both data and servo information. It is disclosed that a track counting coarse positioning system is used to move the heads in a ganged assembly to the vicinity of a desired cylinder. A fine positioning system includes one error circuit for generating an error signal representing the deviation of a servo head from a desired cylinder on the dedicated servo surface. Another error circuit generates a second error signal representing the offset of a selected data head from a selected data track in the same cylinder. Analog circuits combine the error signals to produce an output signal which, when applied to an actuator, centers the selected data head on the selected track.

U.S. Pat. No. 4,419,701 to Harrison, et al. entitled *Data Transducer Position Control System for Rotating Disk Data Storage Equipment*, disclose a system for controlling the position of a head carriage structure of a rotating disk data storage system that includes circuitry for generating a polyphase track boundary signal which compensates for drift, and which doubles or further increases the track density to increase storage capacity. A track centerline sensor circuit is simplified by including the function thereof as microcode routines within a dedicated digital control processor. Error signals are measured periodically across the entire useful field of the disk, and they are constantly updated, so that compensation for drift, runout and offset of the disk relative to the data transducer is achieved. Track overshoot during track seeking movements of the transducer is accommodated, enabling reduced track average access time.

U.S. Pat. No. 4,524,397 to Chalmers, et al. entitled *Head Positioning System for a Disc Data Store*, disclose a disc data store, wherein a read/write head is radially positionable by a feedback servomechanism to interact with a selectable one out of a plurality of radially equispaced data storage tracks on a rotary disc. Positioning errors resultant from phase errors between the plural signals available as the output of an optical grating head position transducer are eliminated by replacing one of the data storage tracks with a servo track by arranging that the period of the recursive, triangular wave position indicating signals from the transducer is equal to twice the radial spacing between tracks on the disc, by selecting as the exclusive-used position indicating signal that one of the plurality of transducer signals which brings the head to the center of the servo track with least offset, and while employing that selected signal or its generated inverse as the feedback signal to the servomechanism applying that least offset as a correction when positioning the head over data storage tracks.

U.S. Pat. No. 4,797,756 to Yoshihara, et al. entitled *Method for Positioning Head in Disk Drive Deriving "Position" Offset from "Quadrature" Signals*, disclose for a disk drive servo system using position and position-quadrature signals, a method for automatically effecting "Absolute Track Registration" and compensating for "offsets" by using the peak position of one of the signals to find a "true" position (true offset) for the other, wherein the R/W actuator is brought to rest at a reference position and a sample-offset signal generated, while the corresponding magnitude of related positioning signals are detected. This is repeated until the peak values of the positioning signals are located, whereupon the corresponding position-offset is derived as "true offset", the actuator then being repositioned by the "true offset" value; and repeating this for a given number of track sites across the disk.

U.S. Pat. No. 4,812,726 to Benii, et al. entitled *Servo Circuit Positioning Actuator*, disclose a servo system for controlling the position of an object in accordance with a servo signal, employing an A/D converter to normalize an error in the position of the object and to enable digital correction of an offset in the system and digital compensation for track jumping and drop outs.

U.S. Pat. No. 4,954,907 to Takita entitled *Head Positioning Control Method and System*, discloses a data recording disk file, wherein head positioning servo information is located in sectors angularly spaced around the disk, and utilizes a head positioning control system for data track following. The control system includes timing circuitry and head position detection circuitry for generating, respectively, a servo sector initiation signal and a signal representative of the head position relative to the centerline of the desired data track to be followed. The control system also includes a velocity detector for determining the velocity of the head relative to the data tracks, a microprocessor for computing an actuator input current signal for moving the actuator and the attached head so as to maintain the head on the desired data track between servo, and memory storage means for storing predetermined constants and values of previously measured head velocity and previously computed actuator input current signals. In response to the servo sector initiation signal, the microprocessor computes a new actuator input current signal based upon the new measured head position, the new measured head velocity, the previously measured head velocity, the previously computed actuator input current signal, and predetermined stored constants, and outputs this new current signal to the actuator. The microprocessor computation takes advantage of the fact that the disturbance to the position of the head during track following and between servo sectors is directly related to the difference between the actuator acceleration of the head and the previously set head acceleration.

U.S. Pat. No. 5,184,257 to Koga, et al. entitled *Head Positioning Control for a Spindle Motor Disk Drive*, disclose a disk drive including a data recording disk and disk head for recording data and reproducing data from the disk. It is disclosed that arms support the disk head. An actuator drives the arm moving the disk head to a predetermined data recording track of the disk. A spindle motor rotates the disk. An actuator unit moves the disk head to select a track on the disk. First positioning data for positioning the disk head is provided on at least one data surface. Second positioning data is provided on at least one data surface. A control is coupled to the actuator for controlling the positioning of the disk head and the searching of the disk in response to the first and second positioning data. The second positioning data can be located on positioning tracks not used for data. The second positioning information as part of a second positioning data is stored. The disk head position is compensated by the stored second positioning information which is superimposed with the first positioning data.

U.S. Pat. No. 5,189,653 to Yanagi entitled *Optical Disk Device Eliminating Offset of Actuator and Offset Eliminating Method Used Thereby*, discloses an optical disk device for eliminating an offset of an actuator which controls a fine adjustment of a tracking control. In the device, during an offset measuring mode, an electric drive current of the actuator is changed and the drive current is stored and held when a detection output at a neutral position in a position detector of the actuator is obtained. Then, during a usual operation mode, the obtained offset current is constantly supplied as the drive current of the actuator, whereby a spring force is cancelled and an offset of the tracking error signal is eliminated.

U.S. Pat. No. 5,235,478 to Hoshimi, etal. entitled *Disc Drive Apparatus with Servo Tracks Offset from Data Tracks*, discloses a disc drive apparatus with a tracking servomechanism, including at least one disc medium having data surfaces where servo signal and data signal are recorded; transducer means having a first head for reproducing the data signal from the data tracks in a playback mode, and a second head for recording the data signal on the data tracks in a recording mode; a rotary arm for supporting the transducer means at one end thereof; actuator motor means for driving the rotary arm in a manner to move the transducer means over the data tracks; servo signal processing means for receiving and processing the servo signal reproduced by the transducer means and outputting first and second servo control signals; and positioning control means for controlling the actuator motor means in the playback and recording modes respectively in accordance with the first and second servo control signals so that the first head of the transducer means is positioned precisely on any selected one of the data tracks in the playback mode and also that the second head is positioned precisely on any selected one of the data tracks in the recording mode.

U.S. Pat. No. 5,251,194 to Yoshimoto, et al. entitled *Techniques for Controlling Beam Position and Focus in Optical Disk Drives*, disclose an optical disk drive for recording an reproducing information on an optical disk medium including a servo circuit for controlling tracking of a light beam on a predetermined track and a servo circuit for controlling focus of the light beam on the disk surface. The disk surface is divided into a plurality of regions, and calibration values for adjusting the servo circuits are determined in each region. The calibration values are stored in a memory and are used to adjust the servo circuits during tracking on a predetermined track. The calibration values include tracking offset values, focus offset values, servo deviation threshold values and sensor gain values. A number of techniques are disclosed for automatically determining the calibration values.

U.S. Pat. No. 5,479,388 to Gondou, et al. entitled *Servo Control System for Head Recording And/or Reproducing Information on And/or from Recording Medium*, disclose a servo control system for controlling position of a readout head such as a magnetic or optical head which records, reproduces or erases information on or from a magnetic or magneto-optical disk. This servo control system includes an actuator for moving the head toward a required position on the disk, a position detecting circuit for detecting a position of the head relative to the disk, and a signal processing circuit for processing an output signal from the position detecting circuit to provide a control signal to the actuator. When a value of the signal from the position detecting circuit falls within a preselected range, a controller deactivates a servo control operation of the signal processing circuit and modifies controlled parameters used in the servo control operation in response to a disturbance such as vibration of the system.

SUMMARY OF THE INVENTION

To solve the above problems, an objective of the present invention is to provide an apparatus for controlling the on-track operation of an actuator in a hard disk drive in which a voice coil motor (VCM) driving unit is disabled after applying an unlatch current to the voice coil motor (VCM), and the voice coil motor (VCM) driving unit is enabled if the actuator stops on a predetermined track, where disturbance of the apparatus is zero.

Another objective of the present invention is to provide a method for controlling the on-track operation of an actuator in a hard disk drive.

Accordingly, there is provided an apparatus for holding an actuator on-track in a hard disk drive on a predetermined position of a track, including a voice control motor (VCM) driving unit, a position detecting unit, and a controller. The voice coil motor (VCM) driving unit applies a predetermined current to drive a voice coil motor (VCM), the position detecting unit reads data read by a head to detect a position of the actuator, and the controller disables the voice coil motor (VCM) driving unit after unlatching the actuator, and enables the voice coil motor (VCM) driving unit if the position detecting unit detects that the actuator is positioned on a predetermined track to bring the actuator on-track depending on the output of the position detecting unit.

Also, there is provided a method of holding an actuator on-track in a hard disk drive on a predetermined position of a track. The method steps for controlling an actuator include: to unlatch the actuator, to disable a voice coil motor (VCM) driving unit, to determine whether the actuator stops on a predetermined track, and to enable the voice coil motor (VCM) driving unit if the actuator stops on a predetermined track, to bring the actuator on-track.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
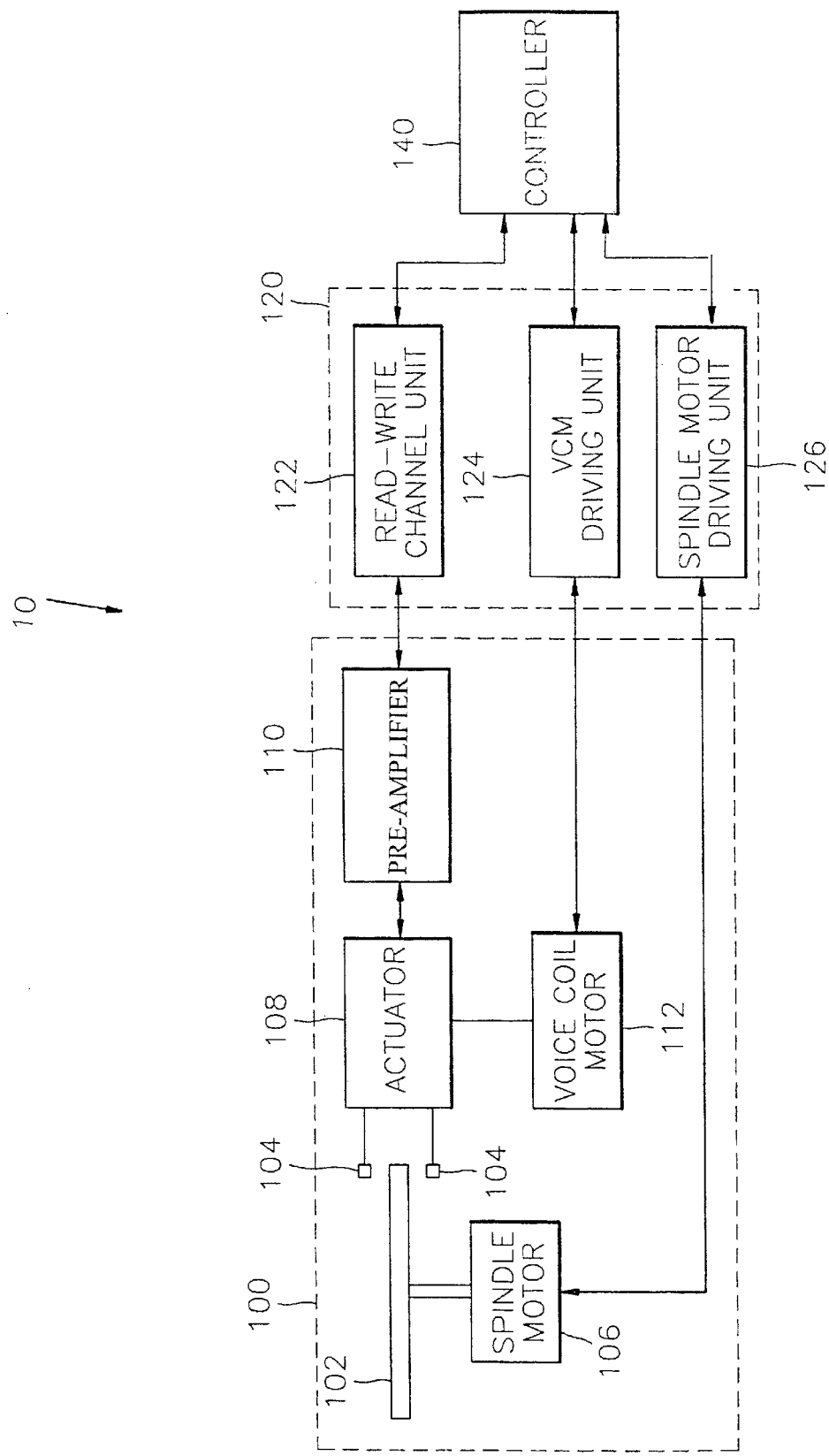
FIG. 1 is a block diagram of an apparatus for controlling the on-track position of an actuator in a hard disk drive, according to the present invention.

Referring to FIG. 1, there is illustrated an apparatus 10 for controlling the on-track position of an actuator in a hard disk drive according to the present invention. The apparatus 10 includes a hard disk assembly unit 100, a driving control unit 120, such as a driving control printed circuit board (PCB) unit, and a controller 140. The hard disk assembly unit 100 includes a hard disk 102, at least one head 104, a spindle motor 106, an actuator 108, a pre-amplifier 110 and a voice coil motor (VCM) 112. The driving control unit 120 includes a read-write channel unit 122, a voice coil motor (VCM) driving unit 124 and a spindle motor driving unit 126. The controller 140, such as including a central processing unit (CPU) or a microprocessor, for example, communicates with the driving control unit 120 to control the read-write channel unit 122, the voice coil motor (VCM) driving unit 124, and the spindle motor driving unit 126.

The hard disk 102 magnetically stores data. The head 104 writes data input from the read-write channel unit 122 on the hard disk 102, and reads data from the hard disk 102, with two heads 104 being illustrated in FIG. 1. The spindle motor 106 rotates the hard disk 102 at a constant speed, and the voice coil motor (VCM) 112 moves the actuator 108 to a predetermined position on the hard disk 102. The read-write channel unit 122 reads analog data read by the head 104 passing through the pre-amplifier 110, to detect information of a current position of the actuator 108. The voice coil motor (VCM) driving unit 124 receives a driving voltage from the controller 140 to drive the voice coil motor (VCM) 112.

The controller 140 includes a digital-analog (DA) converter (not shown), and unlatches the actuator 108 and then disables the voice coil motor (VCM) driving unit 124. Also, the controller 140 enables the voice coil motor (VCM) driving unit 124 if the read-write channel unit 122 detects that the actuator 108 is currently positioned on a predetermined track. Also, the controller 140 brings the actuator 108 on-track depending on the information of the position detected by the read-write channel unit 122.

Figure 2:
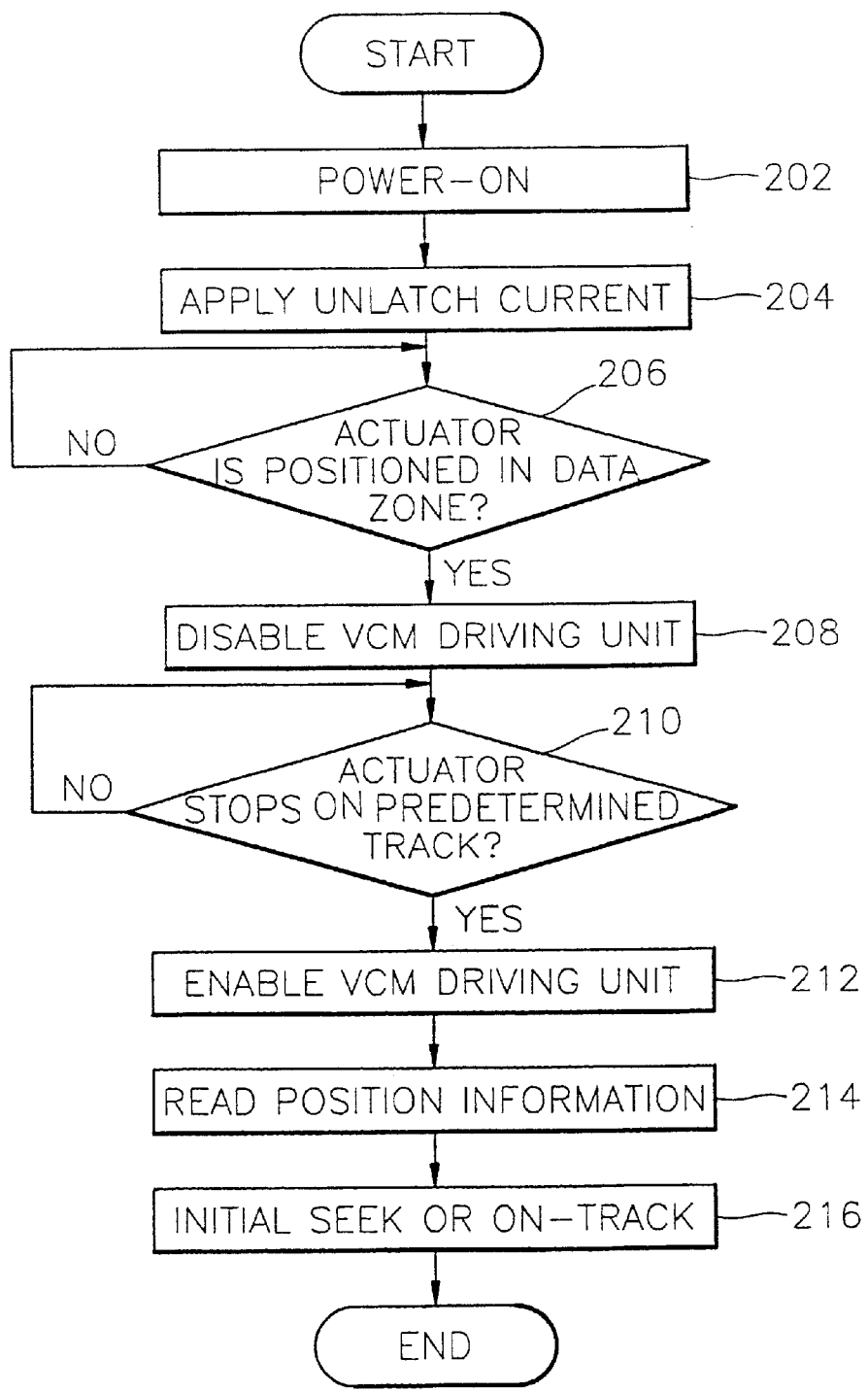
FIG. 2 is a flow chart of a method of controlling the on-track position of an actuator in a hard disk drive, according to the present invention.

Operation of the apparatus of FIG. 1 will now be described with reference to FIGS. 1 through 3.

When the power supply of the hard disk drive is turned on (step 202), a driving voltage of the controller 140 is applied to the voice coil motor (VCM) driving unit 124, and the voice coil motor (VCM) driving unit 124 applies the unlatch current to the voice coil motor 112 (step 204). The controller 140 determines whether the actuator 108 is positioned in a data zone of the hard disk 102 based on the position information detected by the read-write channel unit 122 (step 206). One of the most difficult operations in controlling an actuator 108 is to apply an unlatch current to the voice coil motor (VCM) 112 and to move the actuator 108 to the data zone of hard disk 102. When the actuator 108 is positioned in the data zone of the hard disk 102 after unlatching, the offset of the circuit against the current state occurs, the circuit including various components or devices of apparatus 10, such as the voice coil motor (VCM) driving unit 124, passive elements of the voice coil motor (VCM) 112, and the operation amplifier (OP-AMP) of pre-amplifier 110, for example. Hereinafter, the disturbance due to the offset of the circuit including various components of apparatus 10 will be described as follows.

If the controller 140 of FIG. 1 applies a digital value 'zero' to a digital-analog (DA) converter (not shown) of the controller 140 in order to apply a 'zero' current to the voice coil motor (VCM) 112, a 'zero' voltage is generated in a normal case. However, assuming that the integrated circuit (IC) of the digital-analog (DA) converter of controller 140 has an offset of 5 mV, the output of the digital-analog (DA) converter of controller 140 becomes [0+offset]=5 mV, for example. Also, assuming that the voice coil motor (VCM) driving unit 124 has an offset of 10 mV, for example, a current of [0+digital-analog (DA) converter offset+voice coil motor (VCM) driving unit offset]×(k) is applied to the voice coil motor (VCM) 112. Here, 'k' indicates a gain required to change the voltage to the current. Also, various passive elements, such as a resistor and a capacitor used for a peripheral circuit (not shown) of the voice coil motor (VCM) 112 generate much offset. The resulting offset due to circuits or devices of apparatus 10 causes a high speed of the actuator 108, to thereby disturb the on-track of the actuator 108.

When it is detected that the actuator 108 is positioned in the data zone of hard disk 102 based on the position information detected by the read-write channel unit 122, the controller 140 disables the voice coil motor (VCM) driving unit 124 (step 208), and then detects whether the actuator 108 stops on a predetermined track of hard disk 102 in which the external disturbance due to the offsets of the circuit becomes zero or substantially zero (step 210). When the voice coil motor (VCM) driving unit 124 is disabled, the actuator 108 is moved by effect of the disturbance due to the offsets of circuits or devices of apparatus 10, and the actuator 108 stops in a position where the disturbance becomes zero or substantially zero.

Figure 3:
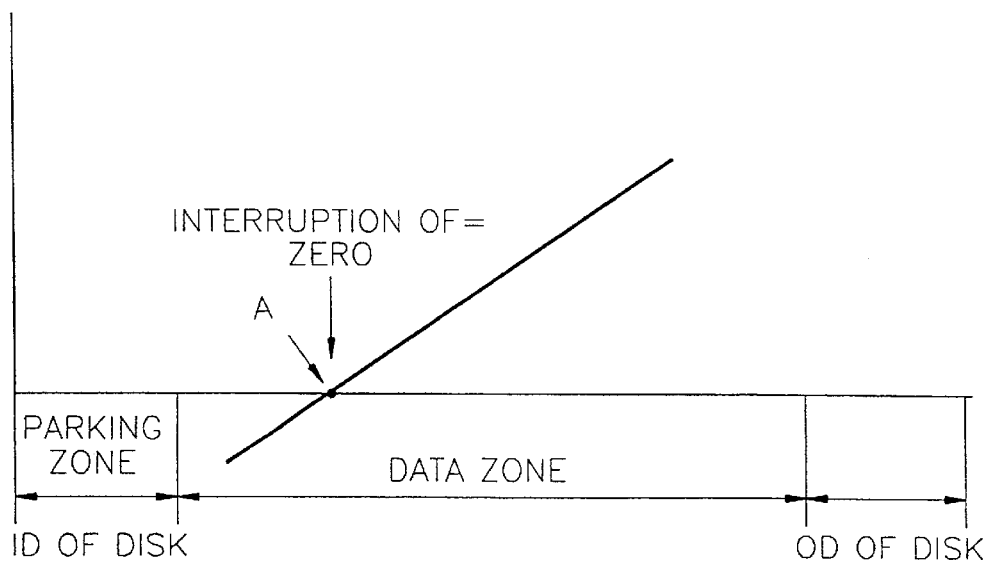
FIG. 3 is a diagram showing external disturbance of devices or components of the apparatus of FIG. 1, depending on a position on a disk.

Referring to FIG. 3, FIG. 3 illustrates external disturbance of devices or components of apparatus 10, depending on a position on hard disk 102. In detail, the apparatus 10 is designed such that the disturbance becomes zero or substantially zero on the data zone of the hard disk 102, as shown in FIG. 3, such as at point A. Accordingly, if the actuator 108 is positioned in an outer disk (OD) region of the hard disk 102 and the voice coil motor (VCM) driving unit 124 is disabled, the actuator 108 moves towards the inner disk (ID) region of the hard disk 102 to stop in a position where the disturbance of a device or devices of apparatus 10 becomes zero or substantially zero, such as at point A of FIG. 3.

If the actuator 108 stops on a predetermined track of the data zone of hard disk 102 where the external disturbance due to the offset of a device or devices of apparatus 10 becomes zero or substantially zero, the controller 140 enables the voice coil motor (VCM) driving unit 124 (step 212), and reads the position information from the read-write channel unit 122 (step 214) to thereby perform the operation of initial seek or on-track (step 216).

According to the apparatus and method of controlling on-track of the actuator in the hard disk drive of the present invention, the voice coil motor (VCM) driving unit is disabled after unlatching, and then the position information is read and the actuator is brought on-track, to thereby minimize the disturbance due to the offset of the circuits or devices, such as the voice coil motor (VCM) driving unit, an operational amplifier (OP-AMP) and one or more passive elements, for example.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for controlling an on-track operation of an actuator in a hard disk drive, comprising:

a voice coil motor driving unit for applying a predetermined current to drive a voice coil motor, the voice coil motor for moving the actuator;

a position detecting unit for reading data read by a head for reading data associated with the actuator to detect a position of the actuator; and a controller for disabling the voice coil motor driving unit after unlatching the actuator so as to move the actuator to a predetermined track of a hard disk associated with the hard disk drive to minimize disturbance due to offset in the apparatus for the on-track operation, and for enabling the voice coil motor driving unit when the position detecting unit detects that the actuator is positioned on the predetermined track of the hard disk associated with the hard disk drive to perform the on-track operation of the actuator.

2. The apparatus as claimed in claim 1, further comprised of the actuator being positioned at a position on the predetermined track of the hard disk associated with the hard disk drive where an external disturbance resulting from at least one device of the apparatus.

3. The apparatus as claimed in claim 2, further comprised of the external disturbance resulting from offset of the at least one device.

4. The apparatus as claimed in claim 3, further comprised of the predetermined track being in a data zone of the hard disk associated with the hard disk drive.

5. The apparatus as claimed in claim 2, further comprised of the predetermined track being in a data zone of the hard disk associated with the hard disk drive.

6. The apparatus as claimed in claim 1, further comprised of the controller disabling the voice coil motor driving unit when the position detecting unit detects the actuator is positioned in a data zone of the hard disk associated with the hard disk drive.

7. The apparatus as claimed in claim 6, further comprised of the actuator being positioned at a position on the predetermined track of the hard disk associated with the hard disk drive where an external disturbance resulting from at least one device of the apparatus becomes zero.

8. The apparatus as claimed in claim 7, further comprised of the external disturbance resulting from offset of the at least one device.

9. The apparatus as claimed in claim 1, further comprised of after the controller disables the voice coil motor driving unit, the actuator is moved to a position on the predetermined track of the hard disk associated with the hard disk drive enable performing the on-track operation of the actuator.

10. The apparatus as claimed in claim 9, further comprised of the actuator being moved to the position on the predetermined track of the hard disk associated with the hard disk drive where an external disturbance resulting from at least one device of the apparatus becomes zero.

11. The apparatus as claimed in claim 10, further comprised of the external disturbance resulting from offset of the at least one device.

12. The apparatus as claimed in claim 11, further comprised of the predetermined track being in a data zone of the hard disk associated with the hard disk drive.

13. The apparatus as claimed in claim 10, further comprised of the predetermined track being in a data zone of the hard disk associated with the hard disk drive.

14. The apparatus as claimed in claim 9, further comprised of the predetermined track being in a data zone of the hard disk associated with the hard disk drive.

15. A method for controlling an on-track operation of an actuator in a hard disk drive, comprising the steps of:

unlatching the actuator;

disabling a voice coil motor driving unit after unlatching the actuator so as to move the actuator to a predetermined track of a hard disk associated with the hard disk drive to minimize disturbance due to offset in the hard disk drive for the on-track operation, the voice coil motor driving unit for driving a voice coil motor for moving the actuator;

determining whether the actuator stops on the predetermined track of the hard disk associated with the hard disk drive; and enabling the voice coil motor driving unit when the actuator stops on the predetermined track of the hard disk associated with the hard disk drive to perform the on-track operation of the actuator.

16. The method as claimed in claim 15, further comprised of the step of unlatching the actuator comprising the step of the voice coil motor driving unit applying a predetermined current to drive the voice coil motor.

17. The method as claimed in claim 16, further comprising the step of moving the actuator to the predetermined track of the hard disk associated with the hard disk drive after disabling the voice coil motor driving unit.

18. The method as claimed in claim 17, further comprised of the actuator being moved to a position on the predetermined track of the hard disk associated with the hard disk drive where an external disturbance resulting from at least one device associated with the hard disk drive becomes zero.

19. The method as claimed in claim 18, further comprised of the predetermined track being in a data zone of the hard disk associated with the hard disk drive.

20. The method as claimed in claim 18, further comprised of the external disturbance resulting from offset of the at least one device.

21. The method as claimed in claim 20, further comprised of the predetermined track being in a data zone of the hard disk associated with the hard disk drive.

22. The method as claimed in claim 15, further comprised of the predetermined track being in a data zone of the hard disk associated with the hard disk drive.

23. The method as claimed in claim 22, further comprised of the step of disabling the voice coil motor driving unit occurring when the actuator is positioned in the data zone of the hard disk associated with the hard disk drive.

24. The method as claimed in claim 15, further comprising the step of moving the actuator to the predetermined track of the hard disk associated with the hard disk drive after disabling the voice coil motor driving unit.

25. The method as claimed in claim 24, further comprised of the actuator being moved to a position on the predetermined track of the hard disk associated with the hard disk drive where an external disturbance resulting from at least one device associated with the hard disk drive becomes zero.

26. The method as claimed in claim 25, further comprised of the predetermined track being in a data zone of the hard disk associated with the hard disk drive.

27. The method as claimed in claim 26, further comprised of the step of disabling the voice coil motor driving unit occurring when the actuator is positioned in the data zone of the hard disk associated with the hard disk drive.

28. The method as claimed in claim 27, further comprised of the external disturbance resulting from offset of the at least one device.

* * * * *